United States Patent [19]

Doslik

[11] 3,763,313

[45] Oct. 2, 1973

[54] APPARATUS AND METHOD OF TRANSFERRING A PATTERN TO A PROGRAMME CARRIER

[75] Inventor: Peter Doslik, Bonlanden, Germany

[73] Assignee: Firm Franz Morat GmbH, Stuttgart-Vaihingen, Germany

[22] Filed: Apr. 19, 1972

[21] Appl. No.: 245,407

[30] Foreign Application Priority Data

Apr. 21, 1971 Germany .................. P 21 19 291.6

[52] U.S. Cl. .......................... 178/6.6 R, 178/DIG. 3

[51] Int. Cl. .............................................. G11b 7/00

[58] Field of Search .................... 178/6.6 R, DIG. 3; 340/174.1

[56] References Cited

UNITED STATES PATENTS 1,973,539 9/1934 Morton ........................... 178/6.6 R 2,154,512 4/1939 Kleinschmidt .................. 178/6.6 R

*Primary Examiner*—Terrell W. Fears

*Attorney*—John Lezdey et al.

[57] ABSTRACT

Apparatus and method of transferring a pattern to a programme carrier, in which electrical signals obtained by operating a keyboard are written into an intermediate store and the intermediate store is read out for the production of the programme carrier, wherein after the writing in of each line of the pattern is completed, the intermediate store is read out without loss of information and the information read out is transferred to the programme carrier, and each line of the pattern subsequent to the first line is written into the intermediate store by altering the information of those points of the stored line which have a pattern alteration as compared with the corresponding points of the preceding line.

18 Claims, 1 Drawing Figure

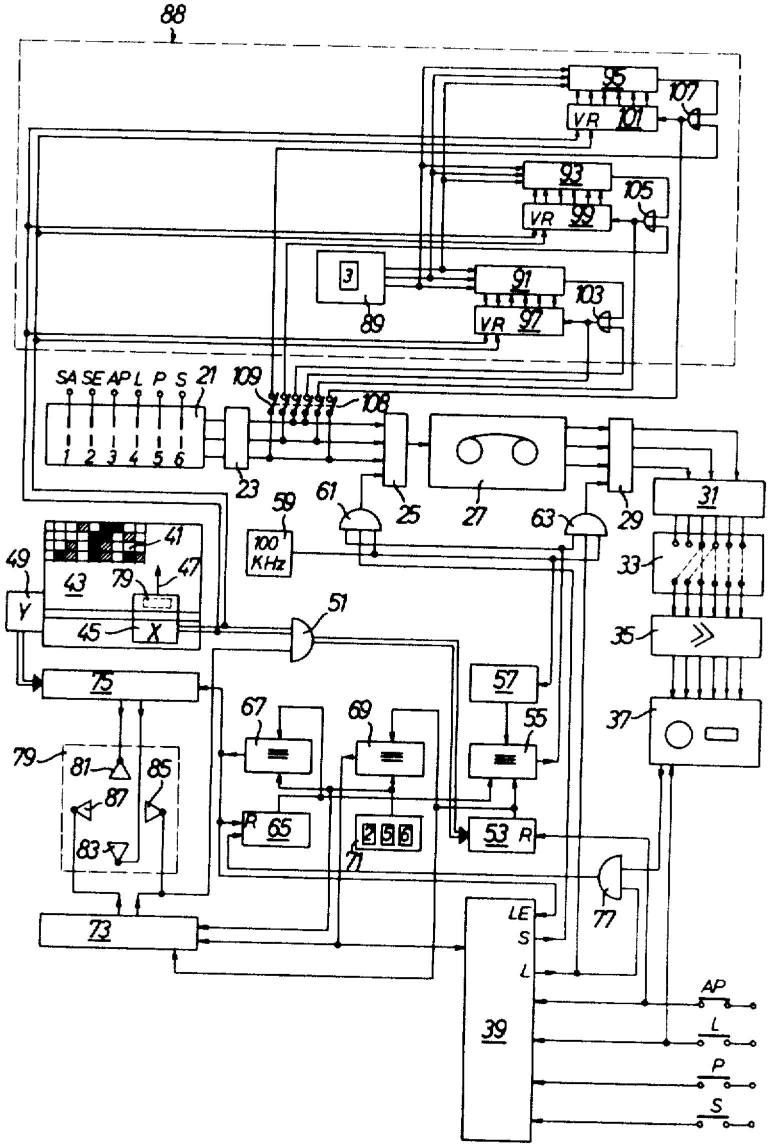
88
95
VR 101
107
93
105
VR 99
3
91
89
103
VR 97
SA SE AP L P S
1 2 3 4 5 6
21
109
108
23
25
27
29
31
33
35
37
61
63
59
100 KHz
41
43
49
Y
79
47
45
X
51
75
57
55
67
69
79
81
85
87
83
65
R
71
256
53
R
77
73
39
LE
S
L
AP
L
P
S

APPARATUS AND METHOD OF TRANSFERRING A PATTERN TO A PROGRAMME CARRIER

The invention relates to a method of and an apparatus for transferring a pattern to a programme carrier, in which the electrical signals obtained by operating a keyboard are written into an intermediate store or memory, and the intermediate store is read out for producing the programme carrier.

From German Pat. No. 1,214,823 and French Pat. No. 1,551,985 it is known to scan a pattern visually point by point and to store on a magnetic tape or on a set of punched cards the electrical signals obtained by operating the keyboard. The magnetic tape or the punched cards are then read out automatically at a later point of time, the information read out being supplied to a device for making a punched tape or control film.

One of the known devices is suitable only for making programme carriers on which the information is applied in a very definite order. The production of such programme carriers presupposes that the operator when operating the keyboard must pay close attention to the number of pattern lines to be scanned in a cycle, and, in addition, to how often each individual line is to be scanned. Furthermore, like the other known device, it has the serious disadvantage that each individual point of the pattern must be written into the intermediate store by operating a key, which is tedious work especially in the case of large patterns, and is frequently accompanied by errors.

The method according to the invention consists in that after writing in of each one line of the pattern has been completed, the intermediate store is read out without loss of information and the information read out is transferred to the programme carrier, and each line of the pattern subsequent to the first line is written into the intermediate store by altering the information of those points of the stored line which have a pattern alteration as compared with the corresponding points of the preceding line.

In an apparatus for transferring a pattern to a programme carrier, comprising an intermediate store, means connected to a keyboard for writing the scanned information into the intermediate store, a reading device for the intermediate store, and means following the reading device for the automatic transfer of the information read out to the programme carrier, according to the invention an addressable intermediate store is constructed as line store with an information content variable at each address, which intermediate store preferably also has means for initiating a reading cycle after the complete writing in of the information associated with one line of the pattern.

A preferred embodiment of the invention includes a further intermediate store connected between the keyboard and the line store in which the information associated with the key last operated is stored until another key is operated.

The invention affords the important advantage that, in the overwhelming number of cases, only the first full line of a pattern need be written into the line store, since in the succeeding lines there are many points whose patterning is unchanged compared with the corresponding points of the previous line. By the use of the additional intermediate store, it is also possible, after operation of any key, to continue the writing-in process in the line direction automatically without renewed operation of a key until a point of the pattern is reached which indicates a change in the pattern.

The invention is preferably applicable to the production of programme carriers, such as punched tapes or films, which carry the information of a coloured pattern and are suitable for controlling textile machines.

The invention will be described in more detail, by way of example, with reference to the accompanying drawing, which is a circuit diagram of one apparatus embodying the invention.

Connected to a keyboard 21 is an intermediate store or memory 23, which stores the electrical code signals produced on the operation of one of the keys 1 to 6 until a key with another code signal is pressed. There is connected to the output of the intermediate store 23, by way of an input gate 25, a line store 27, which is constructed as a store with any access, i.e., for example as a core store, drum store or plate store, static or dynamic shift register or magnetic tape store. The line store 27 has preferably as many storage places as there may at the most be points in a line of the pattern. Particularly suitable is a writing/reading store with direct access (random access memory).

In the production of programme carriers for knitting machines, a knitting-coding unit 33 is connected to the output of the line store 27 by way of an output gate 29 and a coding unit 31. The knitting-coding unit 33 determines among how many and to which tracks of the programme carrier to be made is the information read out of the line store 27 to be distributed. The said unit may consist of a static cross-bar distributor with variable programme, a permanently wired insert part, a cross-bar distributor controlled by punched cards or also a dynamic programming device, which varies its programme in a definite timing or after a definite number of lines. In this way, there is fixed by way of the knitting-coding unit, to how many knitting systems the information obtained from a line of the pattern is to be supplied, so that there is a possibility of producing selectively Jacquard patterns and/or binding patterns.

Connected to the coding unit 31 or, as shown, to the knitting-coding unit 33 by means of an amplifier 35 is a punch device 37 for making perforated tape. In the embodiment illustrated, the punch device 37 has altogether six punch elements. In scanning a coloured pattern with six colours for example, there is associated with each of the colour keys 1 to 6 at least one definite punch element, while when scanning patterns having less than six colours, for example, a number of punch elements may be associated to each colour by means of the knitting-coding unit 33.

After completion of the perforated tape, the latter may be fed into a suitable reading device (not shown), to which is connected the machine to be controlled or a device for making a control tape suitable for the machine. Between these two devices, further devices may be connected for processing, converting and arranging information on the perforated tape as necessary for the particular type of machine.

The keyboard 21 further comprises four keys AP (starting position), L (reading), P (position) and S (writing), which for better understanding are shown again in the lower right-hand part of the drawing. The signals produced when these keys are operated are supplied to a control unit 39. Finally, the keyboard 21 has two other keys SA (sequence start) and SE (sequence end), the purpose of which will be described later.

The pattern 41 to be scanned is spread out on a drawing table 43, above which is mounted a carriage provided with a pointer 47, and adapted to be traversed in the X and Y directions over the entire pattern 41 by means of suitable rails. The movement of the carriage in the X and Y directions is stepped mechanically by means of a link wheel or the like. An X-position transmitter 45 is accommodated in the carriage and by means of two leads (forward and backward running) delivers for each step or stop point, position or time signals when the tip of the pointer 47 is moved in the X direction over the pattern. In addition a Y-position transmitter 49 is provided in the carriage and by means of two leads (forward or backward running) supplies position or time signals when the tip of the pointer 47 is moved over the pattern 41 in the Y direction.

Both position transmitters are constructed such that clear signals, indicating the exact displacement of the tip of the pointer 47, appear at their outputs, regardless of the path taken in reaching a new position.

The output signals of the X-position transmitter 45 are supplied by means of an AND gate 51 to an "address-writing" block 53, which is connected to an input, effective during writing, of a comparator 55. The other input of the comparator 55 is connected to an address counter 57, to whose input time signals are supplied by a time transmitter 59. The time transmitter 59 is also connected to one input of each of AND gates 61 and 63, whose outputs are connected to an input of the input gate 25 and output gate 29, respectively. A further input of each of the two AND gates 61 and 63 is connected to the output of the comparator 55. Third inputs of each of the AND gates 61 and 63 are connected to an output S (writing) and L (reading), respectively, of the control unit 39. An input of the comparator 55, which input is operative when reading, is connected to the output of an "address-reading" block 65. The output signals of the address-reading block 65 are in addition supplied to a comparator 67, while the output signals of the address-writing unit 53 are also supplied to a comparator 69. The second inputs of this comparator are connected to the output of a counter 71, by means of which the width of the pattern, expressed in the number of points to be scanned, can be adjusted. The outputs of counter 71, address-writing unit 53 and comparator 69 are connected to an X supervising block 73. The time input of the address-reading unit 65 is connected by way of an AND gate 77 to the output L of the control unit 39, while a resetting input R is connected to the output of the comparator 67, which in addition is connected to an input of the Y supervising unit 75 and to an input LE (end-of-reading) of the control unit 39, the outputs of the Y position transmitter 49 being connected to two further inputs of the Y supervising unit 75. The other input of the AND gate 77 is connected to the punch device 37. Finally one input of the punch device 37 is connected to the key L, while the key AP is connected to the resetting input R of the address-writing unit.

There is provided on the X carriage movable over the entire pattern a lamp panel 79 which for the better understanding is shown again in the bottom left-hand part of the drawing. Mounted on this lamp panel, in the manner shown on the drawing, are four lamps 81, 83, 85 and 87. The two lamps 81 and 83, mounted one above the other, are connected to outputs of the Y-supervising unit 75, while the two lamps 85 and 87, situated adjacent each other, are connected to outputs of the X-supervising unit 73.

The mode of operation of the device so far described is as follows.

First of all, the tip of the pointer 47 is set on the point of the pattern 41 which is situated farthest to the left and at the top, and the counter 71 is set to the number of points occurring in a line. The key AP is then pressed, whereby the address "one" is entered in the "address-writing" block 53. The key S is then pressed, whereby the AND gate 61 is prepared and the AP signal is cleared. The device is now ready for writing the first line of pattern 41 in the line store 27.

By pressing the correct colour key, there appears at the three outputs of the intermediate store 23 a coded colour signal which is written in at the first address of the line store 27 when the input gate 25 has been prepared by way of the AND gate 61. For this purpose, on the one hand, it is necessary for a time signal to appear from the timing transmitter 59 and, on the other hand, a coincidence signal to appear from the comparator 55. The coincidence signal is formed by comparator 55 when the output signals of the address counter 57 agree with those of the address writer 53. Since the address writer 53 is still adjusted by means of the X-position transmitter to the first address, while the address counter 57 rotates continuously and always indicates the address at which writing in is possible, the comparator 55 always transmits a coincidence signal only when the address counter 57 is likewise situated at the first address. The result of this is that the information stored in the intermediate store 23 for the first point of the first line is written in only at the first address of the line store 27.

After operation of the correct colour key for the first point of the line, the tip of the pointer 47 is adjusted to the second point of the first line, and correspondingly by means of the X-position transmitter 45 the address writer 53 is adjusted to the address of the second point. Movement of the pointer 47 after operation of the key for the first point can be effected at once, since the time transmitter 59 operates with a frequency of, for example, 100 kc/s. When the tip of the pointer 47 has been adjusted to the second point, the colour keys 1 to 6 are pressed again, whereby the corresponding information is accommodated at the second address in the line store 27. In this way, all the points of a line are scanned in succession. Since the colour information obtained on operating a key 1 to 6 is stored in the intermediate store 23, it is sufficient to move the tip of the pointer 47 so long over the line until a point is reached which has a different colour from the previous point. By the transport of the pointer 47 in fact the output signals of the address-writing unit 53 are continuously altered by means of the X-position transmitter 45, so that at the commencement of the comparator 55 coincidence signals are continuously produced which lead to the writing in of the same information available at the output of the intermediate store 23 at different addresses in the line store 27. In scanning the first line of the pattern 41 shown in the drawing, therefore, instead of nine points, it is only necessary to write in five points by operating a key 1 to 6.

At the end of the first line, the address signal supplied by the address-writing unit 53 to the comparator 69 agrees with the end-of-line signal permanently adjusted by the counter 71, so that the comparator 69 transmits a coincidence signal which is supplied to the X-supervising unit. By means of the X-supervising unit, on the appearance of this coincidence signal, the right-hand lamp 85 is lit up as soon as the pointer 47 is moved beyond the line and even by only one point. The operator is thereby warned visually that the line end has been passed. This lamp 85 lights up as long as the pointer 47 remains in a position to the right of the line end. When the pointer is returned to the left again into the range of the pattern 41, the lamp 85 is switched off.

By means of the coincidence signal of the comparator 69, on passing the line end, the writing process in addition is blocked by means of the control unit 39, the S signal being cancelled, for example.

After completion of the first line, the key L is pressed, whereby the S signal remains cancelled and an L signal is produced, which prepares the AND gate 63. In addition, there is supplied to the punch device 37 a signal which sets a cam disc, coupled to the perforated tape drive, in rotation, the said cam disc acting on a pulse generator supplying timing signals to the prepared AND gate 77 in the rhythm necessary for the punching operation. Thereupon by means of the address counter 57 and comparator 55, coincidence signals are transmitted continuously to the AND gate 63, so that the information read out at the corresponding addresses of the line store are supplied by way of the coding unit 31, knitting-coding unit 33 and amplifier 35 to the punch device 37. When the address set in the counter 71 is reached, a coincidence signal is transmitted by the comparator 67 to the LE input of the control unit 39 and the Y-supervising unit 75, and in addition the address reading unit 65 is returned to "1" again. By means of the signal appearing at the LE input of the control unit 39, the L signal is cancelled, so that the output gate 29 is blocked and no more information can be read out. The perforated tape can also be switched off by the LE signal, but it is also possible to allow the perforated tape, at each reading cycle, to run a distance corresponding to a maximum line of, for example, 256 points and then allow it to be switched off automatically. Since the L signal disappears on the appearance of the LE signal, no further timing pulses can then reach the address-reading unit.

In the meantime, the operator has adjusted the tip of the pointer 47 to the second line of the pattern 41. This operation is communicated by means of the Y-position transmitter 49 to the Y-supervising unit 75. The Y-supervising unit 75 is constructed, for example, such that the two lamps 81 and 83 are extinguished simultaneously when and only when, on the one hand, the pointer 47 has been shifted by exactly one line, and on the other hand, when the coincidence signal has arrived from the comparator 67. More particularly, the circuit arrangement may be constructed such that in the reading process for the first line, i.e., with the perforated tape still running, the bottom lamp 83 is lit as long as the tip of the pointer 47 is on the first line, while the top lamp 81 is lit as long as the tip of the pointer 47 is on the second or some other line. On the arrival of the coincidence signal from the comparator 67, the bottom lamp 83 is lit when the tip of the pointer 47 is still on the first line, while the top lamp 81 it lit when the tip of the pointer is on the 3rd, 4th, etc. line. For this purpose a counter may be provided which counts the coincidence pulses from the comparator 67.

The principal advantage of the Y-supervising unit is that the operator is warned at any time whether the pointer 47 is situated on the correct line of the pattern for the next scanning operation. Errors due to wrong adjustment of the pointer or selection of a line cannot, therefore, occur.

By the once-pressed AP key, in addition, the starting point of the lines is stored in the X-supervising unit. By this means, the left-hand lamp 87 is always lit when the pointer 47, on its return from right to left, is moved to the left beyond the line commencement. It is in addition possible to combine with the X- and Y-supervising units protective devices which block the writing operation when any lamp is lit.

In scanning the second line, it is necessary to press a key 1 to 6 only when the tip of the pointer 47 is on a point which in comparison with the point above it in the Y direction and located in the first line has another colour. In the pattern shown in the drawing, this means that only on reaching the fourth, fifth, seventh and eight points of the second line need a key be pressed. This advantage follows from the circumstance that after reading out the information of the first line, the corresponding information is still stored identically in the line store 27.

On the basis of the addressing described and the use of the intermediate store 23, the P key is provided for point-by-point variation of the information of a line. By pressing this P key, the writing operation is blocked by cancellation of the S signal, so that the pointer 47 can be carried as desired over a line without the information in the intermediate store 23 being continuously given to the line store 27. On reaching the desired correction point, first the S key pressed and then the correct colour key 1 to 6 is pressed, whereby the information associated with this point in the line store is exchanged. The P key is then again pressed in order on reaching another point to prevent an exhange of the information content of the line store 27. Alternatively, the arrangement may be such that on pressing a colour key, an S signal is also produced automatically.

The described circuit arrangement also has the fundamental advantage that the operator, after writing a line, can move once more up to any desired point of this line and press once more the corresponding colour key without errors being thereby produced. This provides the possibility of pressing the correct key once more to prevent errors at the pattern changing places.

Finally, there is also the advantage that for the case that a line of 250 points for example is drawn "red" except for three points, in a first step at the start of the line the key for "red" is pressed, then the pointer 47 is moved to the end of this line, and thereupon each of the three non-red points can be corrected by means of the P key.

To simplify the writing in of patterns, whose points within one and the same line have at short intervals a periodically recurring colour distribution, i.e., what is called a "sequence", a device 88 is additionally provided. By means of the device 88, the sequence of these points is fixed at the start of the line so that only the first points of each line need be written in manually, while all the other sequences of the same line are written in automatically. The device 88 comprises, for example, a sequence counter 89, in which the number of points belonging to a sequence is adjusted. Three multiplexers 91, 93, 95 are connected to the three outputs of the sequence counter 89. Further inputs of the multiplexers are connected to information outputs of shift registers 97, 99 and 101, to whose timing inputs V and R are fed the forward and backward timing signals of the X position transmitter 45 for forward and backward shift direction respectively. The outputs of the multiplexers are connected by OR gates 103, 105 and 107 to the information inputs of the shift registers 97, 99 and 101. Connected to the other inputs of the OR gates 103, 105 and 107 are the outputs of the intermediate store 23, while the outputs of the OR gates are connected to corresponding inputs of the input gate 25. In the signal path from and to the device 88 switches 108 and 109 are provided, these switches being normally open. By operating the SA key, switch 109 is closed, while by operating the SE key, switch 109 is opened and switch 108 is closed.

The mode of operation of the devices last described is as follows:

In scanning a line, which in ever-recurring sequence has one after the other a red, a green and a blue point, as shown in the fourth line of pattern 41 of the drawing, before scanning, the sequence counter 89 is set to the number "3" (corresponding to a sequence of three points), and the normally open switch 109 is closed by operation of the SA key. Then, as described above, the sequence of the first three points is written in the line store 27 by means of the keys 1 to 6. In this operation, the multiplexers 91, 93 and 95 are adjusted by the sequence counter 89 such that the inputs of the OR gates 103, 105 and 107 connected to them are connected in each case to the third signal output of the corresponding shift registers 97, 99 and 101. Consequently, the coded colour signals appearing at the output of the intermediate store 23 will be shifted into the shift register in the timing of the movement of the pointer 47, i.e., controlled by the X-position transmitter 45. After operation of the keys 1 to 6 for writing in the third point, the information of the first point is situated at the store places No. 3 of the shift registers.

After the writing in of the first sequence the normally open switch 108 is closed and the switch 109 is opened by operation of the SE key. In addition, a switch, not shown, in the direct signal path between intermediate store 23 and input gate 25 is opened, so that only such information can be supplied to the input gate 25 as is stored in the shift registers 97, 99 and 101. The tip of the pointer 47, starting from the fourth point of the line, is then moved successively over the entire line, time signals being supplied continuously to the V inputs of the shift registers. On the movement of the pointer from the third to the fourth point, the information at the store place No. 3 of the shift registers is advanced by way of the multiplexers adjusted to this store place in rotation by one place and in addition is supplied by way of the OR gates 103, 105 and 107 to the input gate 25, so that the information corresponding to the first point is stored again in the line store 27 at the address of the fourth point. On the further movement of the pointer 47, the information in the shift registers is advanced continuously in rotation, so that the sequence first stored is transferred continuously again into the line store 27 without renewed operation of any key.

Alternatively, the sequence counter 89 can be replaced by an internal counter which on keying in of the sequence to the value corresponding to the sequence length stops, and on repeated writing in of the sequence acts as comparator.

If, in a pattern, the sequence is interrupted at only a few points, for example in the case of a chessboard background, each line can then be written in fully by the use of the device 88 and then corrected point by point as described in the foregoing.

The device permits writing in of any pattern 41 with the most inexpensive means in a simple, rapid and faultless manner, and consequently can be operated without trouble by an unskilled operator.

Many modifications may be made to the embodiment example described. Thus, for example, it is possible, instead of the pointer 47 movable over the pattern 41, to use other devices for signalling the position of the scanned points. More particularly, a special keyboard may be provided for this purpose. For scanning larger patterns, however, some automatic signalling of the positions will be preferred.

Furthermore, the line store 27 used may be of any kind, provided only that each store place is selectively addressable. Also, the nature of the coding used is left to the designer. In the presence of only four colour keys, it will suffice, for example, to provide only two signal outputs on the keyboard 21, so that also only two shift registers and two multiplexers will be necessary for the device 88. To increase protection against errors, it is in addition possible to operate with even or odd parity. Instead of the shift registers and multiplexers producing the periodic rotation of the information of a sequence, devices may also be used which store permanently all the information of a sequence and interrogate in rotation. Suitable devices for this purpose are for example combinations of multiplex stages and RS flip flops cooperating with a bidirectional counter, controlled by the X-position transmitter 45 and having a comparator, i.e., constructed substantially like the combination of address writer 53, comparator 55, address counter 57 and counter 71.

In case of necessity, as advantageous further developments, a correction element for mechanical scanning and colour verification or checking may be provided. The correction element acts on the mechanical scanning movement of the pointer 47 in the forward and backward directions as well as in the X and Y directions and consists of a device by means of which the variations in the pattern 41, drawn in the form of a screen, due to fluctuations in temperature or humidity of the air can be compensated. The correction element is always necessary if the total error in the movement of the pointer 47 in the X and/or Y direction over the entire pattern 41 is of the order of magnitude of a screen point or more.

Colour verification facilitates faultless scanning of the pattern by the operator. Preferably, for colour verification as many outwardly not visible lamps of different colours are mounted inside the carriage as there are colour keys 1 to 6 provided on the keyboard 21. Images of these coloured lamps are formed by mirror systems or other suitable optical systems on the transparent tip of the pointer 47, which tip for example is made of Plexiglass. Each coloured lamp is connected to one of the colour keys 1 to 6, so that the tip of the pointer is always lit up in the colour associated with the key last pressed. Since in addition the tip of the pointer 47 stands over the colour point of the pattern 41 to be written in, the operator can tell without difficulty, by visual comparison, whether the correct colour key has been pressed. When scanning a pattern using the device 88, the coloured lamps fitted in the carriage can be switched on between the switch 108 and the input gate 25, so that the tip of the pointer 47 then also lights up with the correct colour when it is passed over a line of the pattern without one of the colour keys 1 to 6 being operated for each individual point.

By a "programme carrier" it is to be understood any device in which the signals, obtained by operating the keyboard 21, can be stored. In addition to punched tapes, magnetic tapes, plate stores, films, picture screens of picture or sight stores, or the like, therefore, more particularly also the usual stores of computers, such as core stores and so forth, in which the scanned pattern can be stored in the desired order, also come into consideration as "programme carriers."

What is claimed is:

1. A method for transferring and storing the information of a pattern having points with different characteristics on a programme carrier, said points being arranged in lines comprising the steps of:

*a.* writing into a random access memory the information of a complete line of said pattern by operating a keyboard and by moving a pointer over said pattern for addressing individual points thereof;

*b.* reading out the stored information of said memory without loss of information and transferring the read-out information of said complete line to the programme carrier;

*c.* storing said read-out information on said programme carrier;

*d.* writing the information of the subsequent line of the pattern into the memory by altering the stored information of only those points of the pattern which have different characteristic as compared with the corresponding points of the preceding line;

*e.* again reading out said memory for transferring the information of said subsequent line to said programme carrier;

*f.* storing the information of said subsequent line on said programme carrier; and repeating steps (*d*), (*e*) and (*f*) until the information of the complete pattern is transferred to said programme carrier.

2. A system for transferring and storing the information of a pattern having points with different characteristics on a programme carrier, said points being arranged in lines, comprising in combination:

*a.* a keyboard having keys each key producing, when operated, an electrical signal corresponding to a predetermined characteristic of said points;

*b.* a random access memory coupled with said keyboard for receiving and storing said signals, the capacity of said memory being at least such that all signals corresponding to the characteristics of the points of a complete line of said pattern may be stored;

*c.* first means individually altering the stored signals of each point; and

*d.* second means transferring signals corresponding to said stored signals from said memory to said programme carrier.

3. A system according to claim 2, wherein said random access memory is a core store.

4. A system according to claim 2, wherein said random access memory is a magnet plate store.

5. A system according to claim 2, wherein said random access memory is a drum store.

6. A system according to claim 2, wherein said random access memory is a static shift register.

7. A system according to claim 2, wherein said random access memory is a dynamic shift register.

8. A system according to claim 2, including a carriage movable over the pattern and adjustable to each point of the pattern and having an X-position transmitter producing X-position signals, said X-position transmitter being coupled to said memory such that each X-position of said carriage corresponds to a different address of said memory.

9. A system according to claim 8, wherein the carriage has at least two verification elements which automatically produce a signal on the adjustment of the carriage to a point situated on the right or left beside the pattern.

10. A system according to claim 8, wherein the carriage is provided with at least two verification elements which, after the scanning and transfer of a line of the pattern to the programme carrier, produce a signal as long as the carriage is not adjusted exactly to the subsequent line of the pattern.

11. A system according to claim 10, wherein at least one of said verification elements also produces a signal as long as the transfer of a line to the programme carrier is not completed.

12. A system according to claim 8, wherein, within the carriage, there is a pointer with a transparent tip, a plurality of colored lamps corresponding to the number of different characteristics of the points and the number of corresponding keys of the keyboard, the image of said lamps being focussed on the transparent tip and the colored lamps being so connected to the keys that the pointer tip lights up in a color corresponding to the key last pressed.

13. A system according to claim 2 including a coding unit connected between the line store and the means for storing the information on the programme carrier.

14. A system according to claim 13, wherein the coding unit consists of a cross-rail distributor, an insert part, and a dynamic programme control device.

15. A system according to claim 13, wherein the coding unit consists of a cross-rail distributor operated by means of punched cards.

16. A system according to claim 2 including means whereby, in the writing-in of a line, a sequence of a number of consecutive points is repeatable automatically without renewed operation of a key, and said repeating means is controlled by said X-position transmitter.

17. A system according to claim 2 including a temporary storage coupled between the keyboard and the memory for storing the signal corresponding to the key last pressed until another key is operated.

18. A system according to claim 2 including an automatic addressing device transferring the signals corresponding to the signals stored in said memory to the programme carrier, said device being controlled by a means for storing the signals on said programme carrier.

* * * * *